United States Patent [19]

Ikeda et al.

[11] 4,210,696

[45] Jul. 1, 1980

[54] ANTISTATIC COMPOSITE FILM AND PROCESS FOR THE PREPARATION THEREOF

[75] Inventors: Tadayoshi Ikeda, Kobe; Yasuzi Omori; Saizo Ikeda, both of Himeji, all of Japan

[73] Assignee: Daicel Ltd., Osaka, Japan

[21] Appl. No.: 963,834

[22] Filed: Nov. 27, 1978

[30] Foreign Application Priority Data

Nov. 28, 1977 [JP] Japan .................................. 52-142416

[51] Int. Cl.² .......................... B32B 7/02; B32B 27/36
[52] U.S. Cl. ..................................... 428/212; 428/216; 428/391; 428/420; 428/412; 428/447; 428/451; 427/302; 427/387; 427/333; 427/412.1; 427/412.3; 427/412.5
[58] Field of Search ............... 428/447, 922, 391, 412, 428/420, 216, 451, 212; 427/387, 302, 407 C, 407 E, 407 G, 333; 260/DIG. 16–DIG. 17

[56] References Cited

U.S. PATENT DOCUMENTS

| | | | |
|---|---|---|---|
| 2,643,964 | 6/1953 | Johannsen | 427/387 |
| 2,815,300 | 12/1957 | Smith | 427/387 |
| 3,172,899 | 3/1965 | Bailey | 260/DIG. 16 |
| 3,423,314 | 1/1969 | Campbell | 428/391 |
| 3,445,276 | 5/1969 | Pikula | 427/387 |
| 3,451,838 | 6/1969 | Burzynski | 428/412 |
| 3,560,244 | 2/1971 | Neuroth | 427/387 |
| 3,799,838 | 3/1974 | Shaw | 428/447 |

*Primary Examiner*—Ellis P. Robinson
*Attorney, Agent, or Firm*—Blanchard, Flynn, Thiel, Boutell & Tanis

[57] ABSTRACT

A composite antistatic coating film comprising a first layer obtained by condensing a hydrolyzed partial condensate of an alkyltrialkoxysilane on the surface of a substrate and a second layer obtained by condensing a hydrolyzate or a hydrolyzed partial condensate of a tetrafunctional silicon compound, a chloropolysiloxane or an alkoxypolysiloxane on the first layer.

14 Claims, 3 Drawing Figures

FIG. I

ANTISTATIC COMPOSITE FILM AND PROCESS FOR THE PREPARATION THEREOF

BACKGROUND OF THE INVENTION

1. Field of the Invention

The present invention relates to an antistatic composite coating film applied on an easily electrostatically chargeable substance whereby to harden the surface of said substance so as to make it more difficult to injure the substance and also to impart an antistatic property to the substance.

2. Description of the Prior Art

Plastics are used widely because of their easy moldability, high impact resistance and light weight. However, plastics have the disadvantages that the surface thereof is easily spoiled or damaged and is easily electrostatically chargeable. The appearance thereof is deteriorated seriously by scratches on the surface thereof and dust adhered thereto and, in the case of transparent plastics, the transparency is reduced disadvantageously. In the cases of plastics to be used as window glass or optical lenses, they must have a hard surface which is difficult to damage, difficult to electrostatically charge by friction and difficult to soil, and the antistatic property should not be lost by washing with water and the transparency should be maintained. There has been no plastic material which satisfies all of those requirements.

For hardening the surface of a plastic to protect it from injury, there has been proposed a process wherein a film of a hydrolyzed condensate of an alkyltrialkoxysilane is formed on the surface of a plastic (for example, Official Gazette of Japanese Patent Laid-open No. 143822/1975). A sufficient antistatic property cannot be obtained by this process, although the resistance to marring is improved. It has also been known that a hydrolyzed condensate of silicon tetrachloride acts as an antistatic agent [Kobunshi (High Molecules), 10, 371 (1961)]. However, a film of a hydrolyzed condensate of silicon tetrachloride is hard and brittle so that a film thereof of appreciable thickness is sometimes cracked when an external stress is applied thereto. If a hydrolyzate of silicon tetrachloride is applied on a film of a sufficiently hardened hydrolyzed condensate of said alkyltrialkoxysilane and then it is hardened, the adhesion between the two films is weak and the antistatic property is deteriorated by ultrasonic washing with water. If a surfactant-antistatic agent is applied onto a hardened coating of hydrolyzed condensate of an alkyltrialkoxysilane, the antistatic agent is washed away by water whereby the antistatic property is lost. If a mixture of the hydrolyzate of alkyltrialkoxysilane, the silicon tetrachloride hydrolyzate and an antistatic agent such as a surfactant-antistatic agent, used in an amount effective for imparting antistatic property thereto, is applied to the surface of a plastic molded article and then is dried and thereby hardened, the resulting coating film is opaque, and the adhesion between the coating film and the substrate, the hardness of the surface and the mar resistance are reduced.

Thus, the antistatic treatments by the prior processes cause some defects and there has not been a completely satisfactory process. However, according to the process of the present invention, an antistatic composite film is formed which film has a high surface hardness and an excellent antistatic property which is not deteriorated by washing with water.

SUMMARY OF THE INVENTION

Figure 1:
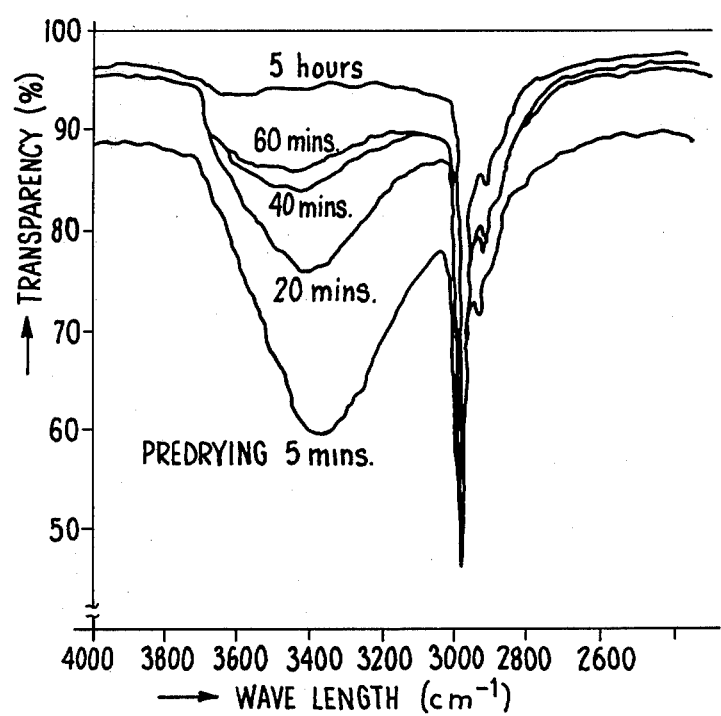
FIG. 1 shows the change in the infrared absorption spectrum caused by varying the predrying time of the first film layer used in Example 1, in which the vertical axis indicates transparency and the horizontal axis indicates wave length.

The present invention provides an antistatic composite film comprising a first layer obtained by condensing a hydrolysis and partial condensation product of a trifunctional silane such as alkyltrialkoxysilane, as hereinafter defined, on the surface of a substrate and a second layer obtained by condensing a hydrolyzate or a hydrolyzed partial condensate of a tetrafunctional silicon compound, a chloropolysiloxane or an alkoxypolysiloxane on the first layer. The invention also provides a process for preparing an antistatic composite film, as aforesaid, in which a first coating layer of a hydrolyzed partial condensate of a silane is applied on the surface of a substrate, then a second coating layer of a hydrolyzate or a hydrolyzed partial condensate of a tetrafunctional silicon compound, a chloropolysiloxane or an alkoxypolysiloxane is applied on the surface of the first layer prior to the completion of the condensation of the first layer and thereafter the condensation of both coating layers is simultaneously completed. A nonionic surfactant can be added to the hydrolyzate or the hydrolyzed partial condensate of a tetrafunctional silicon compound, a chloropolysiloxane or an alkoxypolysiloxane used to make the second layer.

The formation of the composite film according to the invention comprising the first and the second layers, on the surface of an easily electrostatically chargeable substrate, provides an excellent surface coating film possessing a high surface hardness and excellent resistance to marring, an excellent antistatic property and improved resistance to washing with water. The high surface hardness and excellent mar resistance are imparted by the first layer, and the antistatic property is imparted by the second layer. It is a special feature of the invention that the coating film possesses an excellent resistance to washing with water as shown by the fact that the antistatic property is not deteriorated by vigorous washing with water. The excellent water-washing resistance is obtained by applying the hydrolyzate or hydrolyzed partial condensate of tetrafunctional silicon compound, chloropolysiloxane or alkoxypolysiloxane of the second layer before completion of the partial condensation reaction of the hydrolyzate of the silane of the first layer. The composite coating film of the present invention is useful for the treatment of transparent articles made of synthetic resins such as lenses for eye glasses, optical lenses, meter covers and window glass.

The silanes used to make the first layer, according to the present invention, have the formula:

, $R^1Si(OR^2)_3$ wherein $R^1$ represents an alkyl group of 1 to 4 carbon atoms, phenyl group or vinyl group, and $R^2$ represents hydrogen atom, an alkyl group or phenyl group such as methyl, ethyl, propyl, butyl or phenyl group. As a typical alkyltrialkoxysilane, there can be mentioned methyltriethoxysilane. One of the processes for preparing a film of a hydrolyzed condensate of an alkyltrialkoxysilane is as follows: As disclosed in U.S. Pat. No. 3 451 838, an alkyltrialkoxysilane is heated together with water and a very small amount of an acid at a temperature of 50°–80° C. for about 1–10 hours to obtain a hydrolyzed precondensate. To the precondensate is added a solvent and a hardening catalyst whereby to obtain a coating solution. The coating solution is applied to a molded plastic article and then is hardened to obtain a first coating layer of alkyltrialkoxysilane condensate. According to the present invention, a co-condensation product obtained by co-hydrolyzing the alkyltrialkoxysilane with a suitable amount of a tetrafunctional tetraalkoxysilane or a difunctional siloxane, either alone or in the form of a mixture of two or more thereof, can be used as the first layer.

The alkyltrialkoxysilane is condensed to such an extent that the condensate may be dissolved in a solvent such as methanol, ethanol, isopropanol, butanol, acetone, methylethylketone, methyl chloride, tetrahydrofuran, ethylacetate, cellosolve acetate, cellosolve or acetonitrile. The condensate which forms a colorless, transparent solution in a solvent as above, in the colloidal state may be also used. If the condensate proceeds to an excess extent, it cannot be dissolved in a solvent or the solution whitens. The condensation follows the hydrolysis of the silane. Accordingly, the degree of the hydrolysis can be shown by the ratio of $R_1$ to $R_2$. In the invention, it is preferred that the ratio of $R_1$ to $R_2$ is in the range between 8:1 and 12:1.

The tetrafunctional silicon compounds according to the present invention have the formula:

, $SiX_4$ wherein X is a hydrolyzable substituent, preferably a halogen such as chlorine or an alkoxy group having 1 to 4 carbon atoms. As the tetrafunctional silicon compounds, there can be mentioned, for example, silicon tetrachloride, tetramethoxysilane, tetraethoxysilane, tetrapropoxysilane and tetrabutoxysilane. A solution of the hydrolyzate or hydrolyzed partial condensate of the tetrafunctional silicon compound is applied onto a substrate alreadly coated with the first film and is further condensed to obtain the antistatic film. A typical hydrolyzed partial condensate of tetrafunctional silicon compound is obtained by partial hydrolysis of a mixture of silicon tetrachloride, a monohydric alcohol such as methanol or ethanol, water and, if necessary, a solvent. This is applied and dried by heating to further carry out the condensation, thereby obtaining the antistatic condensate film. The hydrolyzate of the tetrafunctional silicon compound can also be obtained by adding water and a very small amount of an acid to a solution of a tetraalkoxysilane such as tetramethoxysilane or tetraethoxysilane in alcohol and then hydrolyzing the mixture. In the above described process, silicon tetrachloride can be replaced with a chloropolysiloxane of the formula:

$Cl_3Si$—O—$SiCl_3$ or $Cl$ $(Cl_2 SiO)_n$ $SiCl_3$ wherein n is 2–20, preferably 3–10. Further, the above mentioned tetraalkoxysilane can be repalced with an alkoxypolysiloxane such as defined by $R^3O$ $(OR_2^3$- $SiO)_n$ $SiOR_3^3$, wherein $R^3$ is alkyl having 1 to 4 carbon atoms and n is 1 to 20.

In the invention, the hydrolysis and condensation of the tetrafunctional silane are shown by the equation:

$$SiX_4 \rightarrow SiX_{4-n}(OH)_n \rightarrow SiX_{4-n}(OH)_{n-a}O_{a/2}$$

The antistatic effect depends on the group "Si-OH" and it is preferable to hydrolyze it to have 2 to 4 moles of OH per one mole of Si, that is, n is 2 to 4, especially n is 4 or close to 4. The condensation of the tetrafunctional silane is conducted to almost the same extent as in the case of the alkyltrialkoxysilane.

For further improving the antistatic property, a nonionic surfactant can be added to the hydrolyzate or partially hydrolyzed condensate of tetrafunctional silicon compound, chloropolysiloxane or alkoxypolysiloxane. As the nonionic surfactants used in the present invention, the following surfactants (1)–(9) are mentioned:

(1) Ethylene oxide adducts of phenol or chlorophenol of the formula:

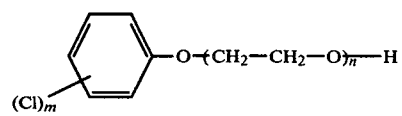

wherein m is 0 or 1–5, preferably 1, and n is more than 1 inclusive, preferably 1–2.

(2) Ethylene oxide adducts of alkylphenols of the formula:

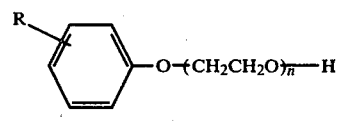

wherein R is an alkyl group, preferably having to 8 carbon atoms, and n is 5.

(3) Glycerol esters of higher fatty acids of the formula:

$$R'COOCH_2CHCH_2OH$$
$$|$$
$$OH$$

wherein the higher fatty acid moiety (R'COOH) is oleic acid, stearic acid, malic acid or the like.

(4) Glycol esters of higher fatty acids of the formula:

$$R'COOCH_2CH_2OH$$

wherein the higher fatty acid moiety is the same as is (3).

(5) Pentaerythritol esters of higher fatty acids of the formula:

$$R'COOCH_2C(CH_2OH)_3$$

wherein the higher fatty acid moiety is the same as in (3).

(6) Ethylene oxide adducts of higher alcohols of the formula:

$$R''-O(CH_2CH_2O)_nH$$

such as ethylene oxide adducts of
  octadecyl alcohol,
  oleyl alcohol,
  lauryl alcohol, and
  glycerol.

(7) Higher fatty acid condensates of the formula:

$$R'COO{-}(CH_2CH_2O)_{\overline{n}}H$$

(8) Higher fatty acid amide condensates of the formula:

$$R'CONH{-}(CH_2CH_2O)_{\overline{n}}H, \text{ and}$$

(9) Higher alkylamine condensates of the formula:

$$R'''{-}NH\begin{matrix}\diagup(CH_2CH_2O)_{n1}H\\ \diagdown(CH_2CH_2O)_{n2}H\end{matrix}$$

The nonionic surfactant is used suitably in an amount of 10–2,000 parts by weight, preferably 10–1,000 parts by weight, per 100 parts by weight of the tetrafunctional silicon compound, chloropolysiloxane or alkoxypolysiloxane.

The antistatic composite film according to the present invention is obtained by the following procedure:

The partially hydrolyzed condensate of the silane is dissolved in an alcohol. To the resulting solution is added a hardening catalyst, a levelling agent, etc. whereby to form a coating solution. The coating solution is applied to an easily electrostatically chargeable substrate or molded article made of a plastic or the like by an dipping process or a spray process. Then it is heated with, for example, a hot air dryer to effect predrying, thereby evaporating the solvent and also beginning the condensation reaction of the silane hydrolyzate. Before the condensation reaction is completed, a coating solution of the hydrolyzate of the tetrafunctional silicon compound, chloropolysiloxane or alkoxypolysiloxane, in a suitable solvent, is applied thereto by dipping or spray method to form the second layer. The object coated with the two layers is then heated again to evaporate the solvent and also to substantially complete the condensation reaction of the first and the second layers, thereby obtaining the antistatic composite film of the present invention. In this procedure, it is particularly important to apply the second coating layer before the condensation of the first layer is substantially completed, whereby to cause a strong adhesive power to exist between the first and the second layers, thereby to impart to the second layer an excellent resistance to washing so that its antistatic property can be maintained after washing with water. Although the reasons for this unexpectedly improved property have not been fully elucidated yet, it is believed that this is due to the facts that the coating solution of the second layer penetrates somewhat into the surface of the first layer so that the second layer is anchored to the first layer and that the —OH group of Si-OH in the partially hydrolyzed condensate of the silane of the first layer is condensed with the —OH group of Si-OH in the hydrolyzate of the tetrafunctional silicon compound in the second layer to form a chemical bond at the interface between the first and the second layers, thereby providing a strong bonding power. Accordingly, it is possible to replace the hydrolyzed condensate of the silane of the first layer with a compound which can be condensed with Si-OH in the hydrolyzate of the tetrafunctional silicon compound or the like in the second layer, such as methylomelamine or methylolurea. It is also possible to use a polyfunctional acrylic resin as the first layer, but the adhesion thereof to the second layer is a little inferior. If the heat-drying time after the first layer coating is applied and before the second layer coating is applied is too long, troubles are caused, namely, the antistatic properties of the final product is deteriorated by washing with water and the second coating layer is repelled on the first coating layer to form water drops. On the other hand, if the heat drying time after the first layer coating is applied and before the second layer coating is applied is too short, the first coating film slips off when the second coating layer is applied thereto to damage the appearance and also to deteriorate the properties of the coating, such as hardness, disadvantageously. For these reasons, the hardening conditions for the first layer should be selected within a suitable range. As for the predrying conditions of the first layer, the second coating layer should be applied to the first coating film after the first coating film has become dry to the touch and before the disappearance of a characteristic absorption at around 3400 cm$^{-1}$, which is supposedly due to -SiOH, in the infrared absorption spectrum.

Furthermore, the second coating can be conducted preferably when the absorption degree, as defined below, is in the range between 0.1 and 1.0, especially 0.2 and 0.6, when R'Si(OR$^2$)$_3$ has an alkyl as R'.

Figure 2:
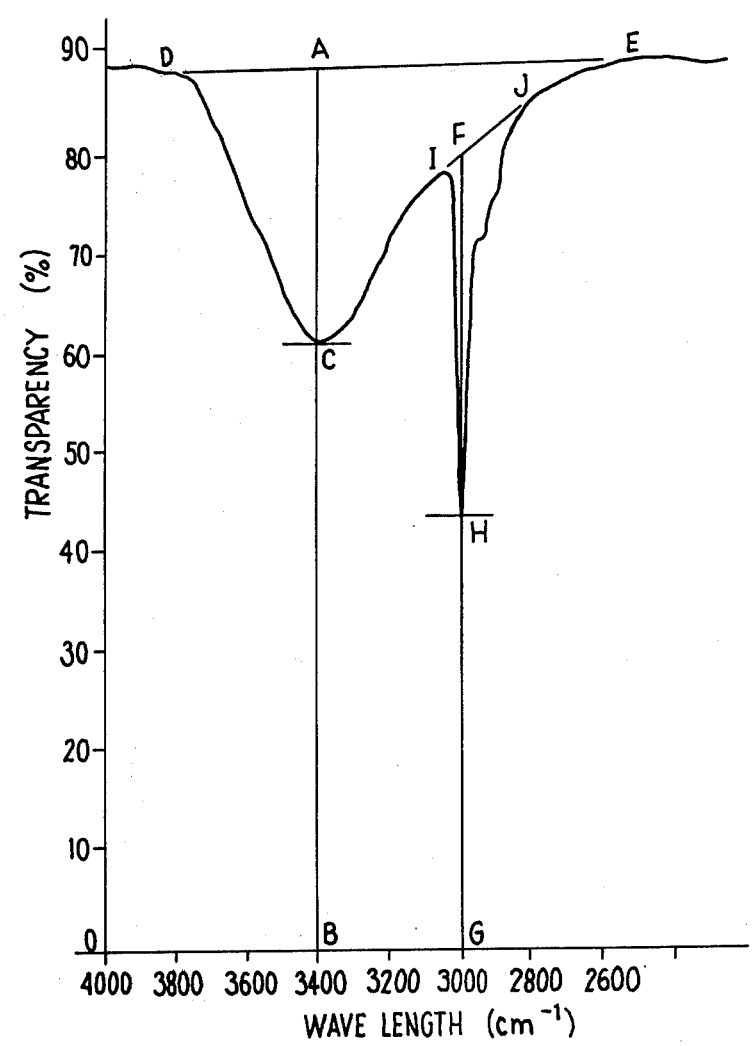
FIG. 2 shows the base line method of calculating absorption degree.

According to the base line method as taught in Jikken Kagaku Kohza (Experimental Chemistry Course) 1, volume 1, first-Kiso Gijutsu (Fundamental Technique), page 400, edited by Japan Chemical Society and published in 1964 by Maruzen, the absorption degree is defined by the equation:

$$\text{Absorption degree} = \frac{\log \overline{AB/CB}}{\log \overline{FG/HG}}$$

in which A, B, C and D are points shown in FIG. 2; $\overline{AB}$ and $\overline{CB}$ each is a differential transparency at a peak appearing about 3400 cm$^{-1}$; and $\overline{FG}$ and $\overline{HG}$ each is a differential transparency at a peak appearing around 2900 to 3000 cm$^{-1}$ for methyl group.

The temperature and the time used in the predrying of the first layer vary depending on the type of the easily electrostatically chargeable substrate used and the recipe of the solution for the first coating layer. For example, in case of a synthetic resin, the temperature should be lower than its heat deformation temperature. The conditions for the predrying comprise usually a temperature of 40°–140° C. and a time of from about 5 minutes to 5 hours.

The temperature and the time of the drying after the application of the second coating layer vary depending on the type of the easily electrostatically chargeable substrate and the recipes of the solutions for the first and the second coating layers. For example, in case of a synthetic resin, the temperature should be lower than its heat deformation temperature. The conditions for the final drying comprise usually a temperature of about 40°–140° C. and a time of about 1–20 hours.

The thickness of the film of the hydrolyzed condensate of the silane defining the first layer varies depending on the intended use thereof and it is generally about 1–20μ, preferably about 3–10μ. The film of the hydrolyzed condensate of tetrafunctional silicon compound or the like, defining the second layer, is preferably as thin as possible, but it is sufficient for imparting the antistatic property. A thick second layer is not necessary because the surface hardness and mar resistance are mainly provided by the first layer. If the second layer is too thick, scratch marks remain on the surface if it is scratched with a fingernail or a sharp substance. On the other hand, if the second layer is too thin, the antistatic property is lost easily, even though mar resistance is excellent. Usually, the thickness of the second layer is 0.001–1µ, preferably 0.1–0.5µ.

The composite film of the present invention is used for coating an easily electrostatically chargeable substrate. The film of the invention is particularly useful for coating easily electrostatically chargeable plastics, inter alia, transparent plastics such as polymethyl methacrylates and polycarbonates. The composite film of the present invention can be applied directly in contact with the easily electrostatically chargeable substrate such as a plastic molded article or, alternatively, another substance may be inserted between the composite film of the present invention and the easily electrostatically chargeable substrate.

The following illustrative examples further describe the present invention in detail. In the examples, the term "parts" means parts by weight.

EXAMPLE 1

120 parts of methyltriethoxysilane, 30 parts of water and 12 parts of 0.001 N hydrochloric acid were charged in a reactor and heated to 50° C. for 4 hours to obtain a partially hydrolyzed condensate of methyltriethoxysilane. The reaction mixture was further heated to expel water and by-produced ethanol. Thereafter, ethanol was added thereto to obtain a 50 wt. % solution of partially hydrolyzed condensate of methyl triethoxysilane. 60 parts of the 50% solution were mixed thoroughly with 20 parts of acetic acid, 20 parts of ethanol, 5 parts of 10% aqueous solution of tetraethyl ammonium hydroxide and 0.5 part of a surfactant to obtain a coating solution, which will be referred to as coating solution A hereinafter.

Separately, a mixture of silicon tetrachloride and ethanol was mixed with water to effect a reaction. Thereafter, the by-produced hydrochloric acid was expelled therefrom to obtain a solution of the hydrolyzate of silicon tetrachloride having a solid content of 2.5 wt. %. 100 parts of the solution were mixed thoroughly with 100 parts of isopropyl alcohol to obtain a coating solution, which will be referred to as solution B hereinafter.

A spherical lens of a thickness of 2 mm obtained by molding polymethyl methacrylate resin was degreased by washing the same thoroughly. The lens was then immersed in solution A, drawn up gently from the solution at a rate of 20 cm/min. and directly predried in a hot air dryer at 90° C. for 20 minutes to form a film of a first layer of hydrolyzed condensate of methyl triethoxysilane on the lens surface.

Figure 3:
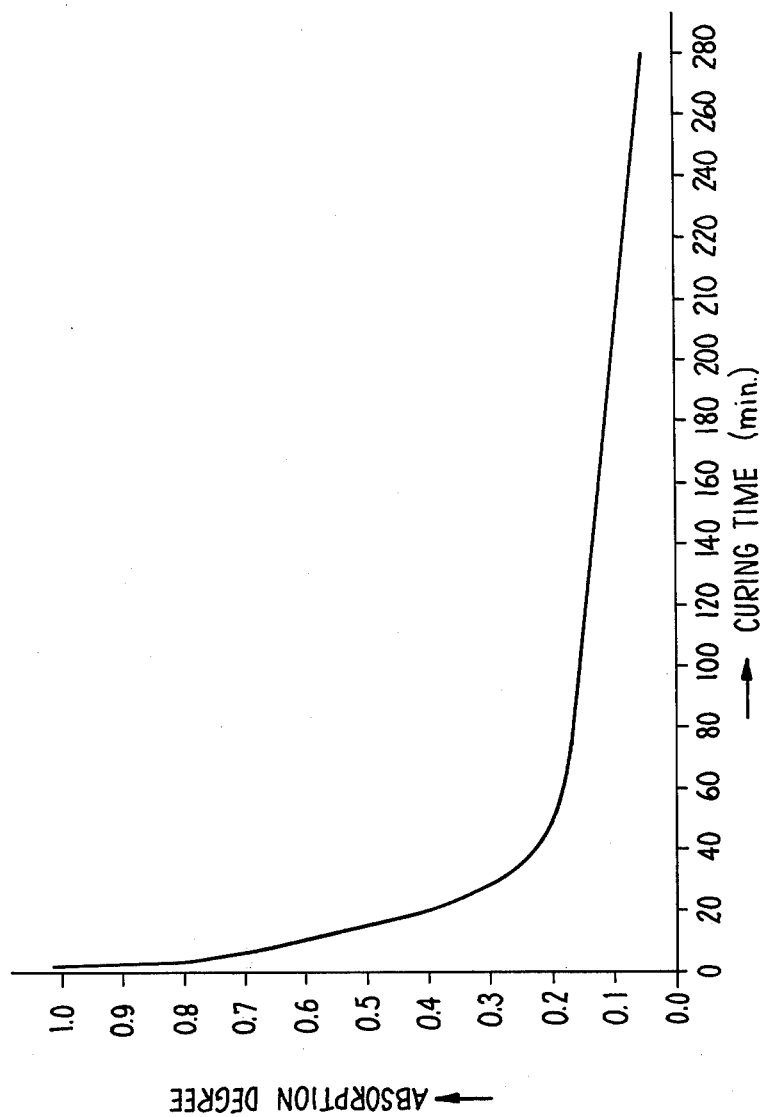
FIG. 3 shows the change of the absorption degree with curing time.

At that time, the lens was dry to the touch and the lens surface was not damaged by touching it with a fingertip. Separately, the solution A was applied to a halite plate with a brush and dried in the same dryer at 90° C. The infrared absorption spectrum was determined at certain intervals. The results are shown in FIG. 1. It is seen that after the predrying at 90° C. for 20 minutes, the absorption at about 3,400 cm$^{-1}$ still remains. FIG. 3 shows the relation between the absorption degree and the curing period of time in the data shown in FIG. 1. The absorption degree of the example according to the invention was 0.4 after the previous drying step for 20 minutes. The lens with the predried first coating layer thereon was then immersed in solution B and drawn up therefrom at a rate of 20 cm/min. to form a second coating layer. The lens was directly placed in the hot air dryer and dried at 90° C. for 5 hours to substantially complete the condensation-hardening. In the infrared absorption spectrum in FIG. 1, the absorption at 3400 cm$^{-1}$ in the first layer disappears completely after the drying at 90° C. for 5 hours. The resulting lens was transparent and had no fault in the appearance thereof. Further, tests were carried out by the following methods. The results obtained are shown in Table 1.

(1) Measurement of half life of voltage

A dry lens was placed in a humidity-controlled atmosphere having a relative humidity of 65%. Then, the lens was electrically charged with a static honest meter at 8,000 V for 30 seconds. Curves showing the interrelationship between the electrostatic voltage of the lens and attenuation thereof were drawn to determine the period required for the attenuation of the voltage to reach one-half of the original value. The lens was washed with water ultrasonically in a water tank provided with an ultrasonic generator. The above-described time values, before and after the washing with water, were compared with each other to learn the resistance of the coating to washing with water.

(2) Ash adhesion test

A lens, the humidity of which was controlled in an atmosphere having a relative humidity of 65%, was rubbed 20 times with a cloth. The lens was brought to a location 2 mm from cigarette ashes to determine whether or not the ash adhered to the lens or not. The lens was washed with water ultrasonically in a water tank provided with an ultrasonic generator. The degrees of adhesion of ash before and after the washing with water were compared with each other as another test to learn the resistance of the coating to washing with water.

(3) Pencil hardness

Pencil hardness was measured under a load of 1,000 g with a pencil hardness meter (a product of Toyo Seiki Co.).

(4) Adhesion

The film on the lens was cut with a razor to form a checkers-like pattern at intervals of 1 mm. A cellophane tape was applied thereto and then it was peeled off strongly. The peeling conditions were measured.

(5) Steel wool test (mar resistance)

The lens surface was injured by rubbing with steel wool and the degree of injury was measured.

(6) Appearance of lens

The appearance was examined with the naked eye.

COMPARATIVE EXAMPLE 1

The procedure in Example 1 was repeated except that the coating film of solution A was hardened by drying at 90° C. for 5 hours without the application of solution B. The properties of the resulting lens are shown in Table 1.

COMPARATIVE EXAMPLE 2

The same procedure as in Example 1 was repeated except that a predrying time of 10 hours was employed instead of 20 minutes. The properties of the resulting lens are shown in Table 1.

COMPARATIVE EXAMPLE 3

The same procedure as in Example 1 was repeated except that a predrying time of 5 minutes was employed instead of 20 minutes. The properties of the resulting lens are shown in Table 1.

It is apparent from Table 1 that the lens obtained in Example 1 has an excellent antistatic property which is not deteriorated even by ultrasonic washing with water. It also exhibits excellent surface hardness, adhesion of the film and resistance to rubbing with steel wool. The lens had a colorless transparent appearance and was suitable for use for optical purposes.

As shown in Comparative Example 1, the lens having only the first coating layer has a very poor antistatic property, although the surface thereof has excellent physical properties. If the predrying time is too long, as in Comparative Example 2, the antistatic property of the lens has a low resistance to washing with water. On the other hand, if the predrying time is too short to form the first layer as in Comparative Example 3, the first coating film is destroyed by the application of solution B for forming the second layer, whereby the appearance of the lens becomes poor and wrinkled.

EXAMPLE 2

Another assistant antistatic agent can be added to solution B for improving the antistatic property. The same procedure as in Example 1 was repeated except that 1 part of chlorophenol/ethylene oxide adduct and 30 parts of water were added to 100 parts of solution B used in Example 1. The results are shown in Table 1. As compared with the results of Example 1, the antistatic property was improved and the other properties were equivalent.

EXAMPLE 3

A colorless transparent molded polycarbonate lens was degreased by washing. The lens was then immersed in 10% solution of polymethyl methacrylate in acetic acid, drawn up gently at a rate of 20 cm/min. and dried in a hot air dryer at 110° C. for one hour. The same procedure as in Example 1 was repeated except that the polycarbonate lens thus coated with polymethyl methacrylate was used in place of the molded lens of polymethyl methacrylate used in Example 1. The properties of the resulting lens are shown in Table 1. The lens thus obtained has an excellent antistatic property which is not deteriorated by ultrasonic washing with water, as well as excellent film hardness, adhesion and mar resistance.

Table 1

| | Predrying Conditions (Temp., time) | (1) Half life of voltage | | (2) Ash adhesion test | | (3) Pencil hardness | (4) Adhesion | (5) Mar Resistance (steel wool) | (6) Lens appearance | Remarks |
| --- | --- | --- | --- | --- | --- | --- | --- | --- | --- | --- |
| | | Before washing with water | After washing with water | Before washing with water | After washing with water | | | | | |
| Example 1 | 90° C.- 20 mins. | 15 secs. | 15 secs. | Not adhered | Not adhered | 6H | Good | Good | Colorless, transparent | |
| Comparative Example 1 | — | Longer than 15 mins. | Longer than 15 mins. | Adhered | Adhered | 6H | Good | Good | Colorless, transparent | |
| Comparative Example 2 | 90° C. - 10 hrs. | 15 secs. | 3 mins. | Not adhered | Adhered | 3H | Bad* | Bad | Colorless, transparent | *The second layer was peeled off. |
| Comparative Example 3 | 90° C.- 5 mins. | — | — | — | — | — | — | — | The first layer was wrinkled | |
| Example 2 | 90° C. - 20 mins. | 3 sec. | 5 sec. | Not adhered | Not adhered | 6H | Good | Good | Colorless, transparent | |
| Example 3 | 90° C. - 20 mins. | 15 secs. | 17 secs. | Not adhered | Not adhered | 4H | Good | Good | Colorless, transparent | |

The embodiments of the invention in which an exclusive property or privilege is claimed are defined as follows:

1. A coated article having a high surface hardness, resistance to marring, an antistatic property and improved resistance to washing with water, comprising: a substrate having a surface made of an easily electrostatically chargeable material; a first layer coated on the surface of said substrate; a second layer coated on said first layer; said first and second layers having been prepared by applying onto said surface of said substrate a first coating layer of a solution in a first organic solvent of a solvent-soluble, further-curable product obtained by partial hydrolysis and condensation of alkyltrialkoxysilane having the formula $R^1Si(OR^2)_3$, wherein $R^1$ is alkyl having 1 to 4 carbon atoms, phenyl or vinyl and $R^2$ is alkyl having 1 to 4 carbon atoms or phenyl, and drying said first coating layer to evaporate said first organic solvent and to begin further condensation of said further-curable product, and then before the condensation reaction in the first coating layer is completed applying onto said first coating layer a second coating layer of a solution in a second organic solvent of a solvent-soluble hydrolyzate or hydrolyzed partial condensate of hydrolyzable tetrafunctional silicon compound, chloropolysiloxane or alkoxypolysiloxane, and heating the first and second layers to evaporate the second solvent and to substantially complete condensation reactions in the first and second coating layers.

2. A coated article as claimed in claim 1, in which said second layer additionally contains from 10 to 2000 parts by weight of nonionic surfactant effective for improving the antistatic properties of said coated article, per 100 parts by weight of said tetrafunctional silicon compound, chloropolysiloxane or alkoxypolysiloxane.

3. A coated article according to claim 1 wherein said tetrafunctional silicon compound has the formula $$SiX_4$$

wherein X is chloro or alkoxy having 1 to 4 carbon atoms, said chloropolysiloxane has the formula $$Cl_3Si-O-SiCl_3 \text{ or the formula } Cl+Cl_2SiO\!\!+_{\!\!n}\!SiCl_3$$

wherein n is from 2 to 20, and said alkoxypolysiloxane has the formula $$R^3O(OR_2{}^3SiO\!\!+_{\!\!n}\!SiOR_3{}^3$$

wherein $R^3$ is alkyl having 1 to 4 carbon atoms and n is 1 to 20.

4. A coated article according to claim 1 consisting of said substrate, said first layer having a thickness of from 1 to 20 microns and said second layer having a thickness of from 0.001 to 1 micron.

5. A coated article according to claim 1 in which said substrate is transparent and is made of poly(methylmethacrylate) or polycarbonate.

6. A coated article according to claim 1 in which said alkyltrialkoxysilane is methyltriethoxysilane and said second layer is made by condensing a hydrolyzate of silicon tetrachloride.

7. A coated article according to claim 1 in which in said product obtained by partial hydrolysis and condensation of said alkyltrialkoxysilane, the ratio of $R_1$ to $R^2$ is in the range between 8:1 and 12:1.

8. A coated article according to claim 1 in which said substrate, said first layer and said second layer are transparent.

9. A coated article according to claim 1 in which said solution for preparing said first coating layer contains a hardening catalyst and said first coating layer is heated for a time and at a temperature effective to evaporate said first solvent to dry said first layer and to effect an incomplete condensation reaction so that the first layer exhibits a characteristic absorption at around 3400 cm$^{-1}$ in the infrared absorption spectrum, and then said second coating layer is immediately applied to said dried first coating layer.

10. A coated article according to claim 9 in which the second coating layer is applied when the absorption degree in the first coating layer is from 0.1 to 1.0, wherein $$\text{Absorption degree} = \frac{\log \overline{AB}/\overline{CB}}{\log \overline{FG}/\overline{HG}}$$

wherein $\overline{AB}$, $\overline{CB}$, $\overline{FG}$ and $\overline{HG}$ are as shown in FIG. 2 of the attached drawings.

11. A process for preparing a transparent coated article having a high surface hardness, resistance to marring, an antistatic property and improved resistance to washing with water, comprising: applying to a substrate having a surface made of an easily electrostatically chargeable material a first coating layer of a solution in a first organic solvent of a solvent-soluble, further-curable product obtained by partial hydrolysis and condensation of alkyltrialkoxysilane having the formula R$^1$Si-(OR$^2$)$_3$, wherein R$^1$ is alkyl having 1 to 4 carbon atoms, phenyl or vinyl and R$^2$ is alkyl having 1 to 4 carbon atoms or phenyl, and drying said first coating layer to evaporate said first organic solvent and to begin further condensation of said further-curable product, and then before the condensation reaction in the first coating layer is completed applying onto said first coating layer a second coating layer of a solution in a second organic solvent of a solvent-soluble hydrolyzate or hydrolyzed partial condensate of hydrolyzable tetrafunctional silicon compound, chloropolysiloxane or alkoxypolysiloxane and heating the first and second layers to evaporate the second solvent and to substantially complete the condensation reactions of the first and second coating layers.

12. A process according to claim 11 in which said solution for preparing said first coating layer contains a hardening catalyst and said first coating layer is heated for a time and at a temperature effective to evaporate said first solvent to dry said first layer and to effect an incomplete condensation reaction so that the first layer exhibits a characteristic absorption at around 3400 cm$^{-1}$ in the infrared absorption spectrum, and then immediately applying said second layer to said dried first coating layer.

13. A process according to claim 11 in which the second coating layer is applied when the absorption degree in the first coating layer is from 0.1 to 1.0, wherein $$\text{Absorption degree} = \frac{\log \overline{AB}/\overline{CB}}{\log \overline{FG}/\overline{HG}}$$

wherein $\overline{AB}$, $\overline{CB}$, $\overline{FG}$ and $\overline{HG}$ are as shown in FIG. 2 of the attached drawings.

14. A process according to claim 11 wherein said tetrafunctional silicon compound has the formula $$SiX_4$$

wherein X is chloro, or alkoxy having 1 to 4 carbon atoms, said chloropolysiloxane has the formula $$Cl_3Si-O-SiCl_3 \text{ or the formula } Cl+Cl_2SiO\!\!+_{\!\!n}\!SiCl_3$$

wherein n is from 2 to 20, and said alkoxypolysiloxane has the formula $$R^3O+OR_2{}^3SiO\!\!+_{\!\!n}\!SiOR_3{}^3$$

wherein $R^3$ is alkyl having 1 to 4 carbon atoms and n is 1 to 20.

* * * * *